US008631112B2

(12) United States Patent
Kobayashi

(10) Patent No.: US 8,631,112 B2
(45) Date of Patent: Jan. 14, 2014

(54) MANAGEMENT SYSTEM, MANAGEMENT APPARATUS, MANAGEMENT METHOD, AND NON-TRANSITORY COMPUTER READABLE MEDIUM STORING CONTROL PROGRAM FOR REGISTERING PROCESSING DEVICES

(75) Inventor: Yutaka Kobayashi, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 136 days.

(21) Appl. No.: 13/230,295

(22) Filed: Sep. 12, 2011

(65) Prior Publication Data
US 2012/0246285 A1 Sep. 27, 2012

(30) Foreign Application Priority Data
Mar. 25, 2011 (JP) .................. 2011-067225

(51) Int. Cl.
*G06F 15/173* (2006.01)
(52) U.S. Cl.
USPC ........................... 709/223; 709/203; 709/224
(58) Field of Classification Search
USPC ........................................ 709/203, 223, 224
See application file for complete search history.

(56) References Cited

U.S. PATENT DOCUMENTS

| 7,391,743 | B2 | 6/2008 | Momozono et al. | |
|---|---|---|---|---|
| 7,500,252 | B1* | 3/2009 | Angeline et al. | 719/330 |
| 2005/0147091 | A1 | 7/2005 | Momozono et al. | |
| 2007/0281691 | A1* | 12/2007 | Svensson | 455/435.1 |
| 2008/0225731 | A1* | 9/2008 | Mori et al. | 370/242 |
| 2009/0248867 | A1* | 10/2009 | Kishimoto | 709/224 |
| 2010/0077076 | A1* | 3/2010 | Wada | 709/224 |
| 2010/0235498 | A1* | 9/2010 | Handa | 709/224 |
| 2013/0055303 | A1* | 2/2013 | Kannan et al. | 725/25 |

FOREIGN PATENT DOCUMENTS

| JP | 2005-176279 A | 6/2005 |
|---|---|---|
| JP | 2007-206998 A | 8/2007 |

* cited by examiner

*Primary Examiner* — Ramy M Osman
(74) *Attorney, Agent, or Firm* — Sughrue Mion, PLLC

(57) ABSTRACT

A management system includes: plural management apparatuses each of which includes a first transmitting unit that, when processing devices connected to a communication unit are searched with reference to a first management table in which information of a processing device managed by the management apparatus is registered and a processing device which is not managed by the management apparatus is detected, transmits detection information of the processing device to the communication unit, and a first registration unit, when a processing device management request corresponding to the detection information of the processing device is received from the communication unit, registers information of the processing device related to the processing device management request in the first management table; and an information management server including a change unit that changes information of the management apparatus and a second transmitting unit that transmits the processing device management request to the communication unit.

11 Claims, 11 Drawing Sheets

FIG. 9

| IP ADDRESS OF DEVICE |
| --- |
| SERIAL NUMBER OF DEVICE |
| SERIAL NUMBER OF PREVIOUS MANAGEMENT APPARATUS |
| SERIAL NUMBER OF MANAGEMENT APPARATUS |
| STATE OF DEVICE (NON-INSTALLED/INSTALLED/MISSING) |

US 8,631,112 B2

MANAGEMENT SYSTEM, MANAGEMENT APPARATUS, MANAGEMENT METHOD, AND NON-TRANSITORY COMPUTER READABLE MEDIUM STORING CONTROL PROGRAM FOR REGISTERING PROCESSING DEVICES

CROSS-REFERENCE TO RELATED APPLICATIONS

This application is based on and claims priority under 35 USC 119 from Japanese Patent Application No. 2011-067225 filed Mar. 25, 2011.

BACKGROUND

Technical Field

The present invention relates to a management system, a management apparatus, a management method, and a non-transitory computer readable medium storing a control program.

SUMMARY

According to an aspect of the invention, there is provided a management system including: plural management apparatuses each of which includes a first transmitting unit that, when processing devices connected to a communication unit are searched with reference to a first management table in which information of a processing device managed by the management apparatus is registered and a processing device which is not managed by the management apparatus is detected, transmits detection information of the processing device to the communication unit, and a first registration unit that, when a processing device management request corresponding to the detection information of the processing device is received from the communication unit, registers information of the processing device related to the processing device management request in the first management table; and an information management server that includes a change unit and a second transmitting unit, wherein, in the information management server, when information of the processing device related to the detection information of the processing device received from the communication unit is registered in a second management table in which the information of the processing device and information of the management apparatus managing the processing device are associated with each other, the change unit changes the information of the management apparatus associated with the information of the processing device which is related to the detection information of the processing device in the second management table to the information of the management apparatus transmitting the detection information of the processing device, and when the information of the processing device related to the detection information of the processing device received from the communication unit is registered in the second management table, the second transmitting unit transmits the processing device management request to the communication unit.

BRIEF DESCRIPTION OF THE DRAWINGS

Exemplary embodiments of the present invention will be described in detail based on the following figures, wherein:

FIG. 9 is a diagram illustrating an example of a device management table;

DETAILED DESCRIPTION

An exemplary embodiment relates to a management system.

Figure 1:
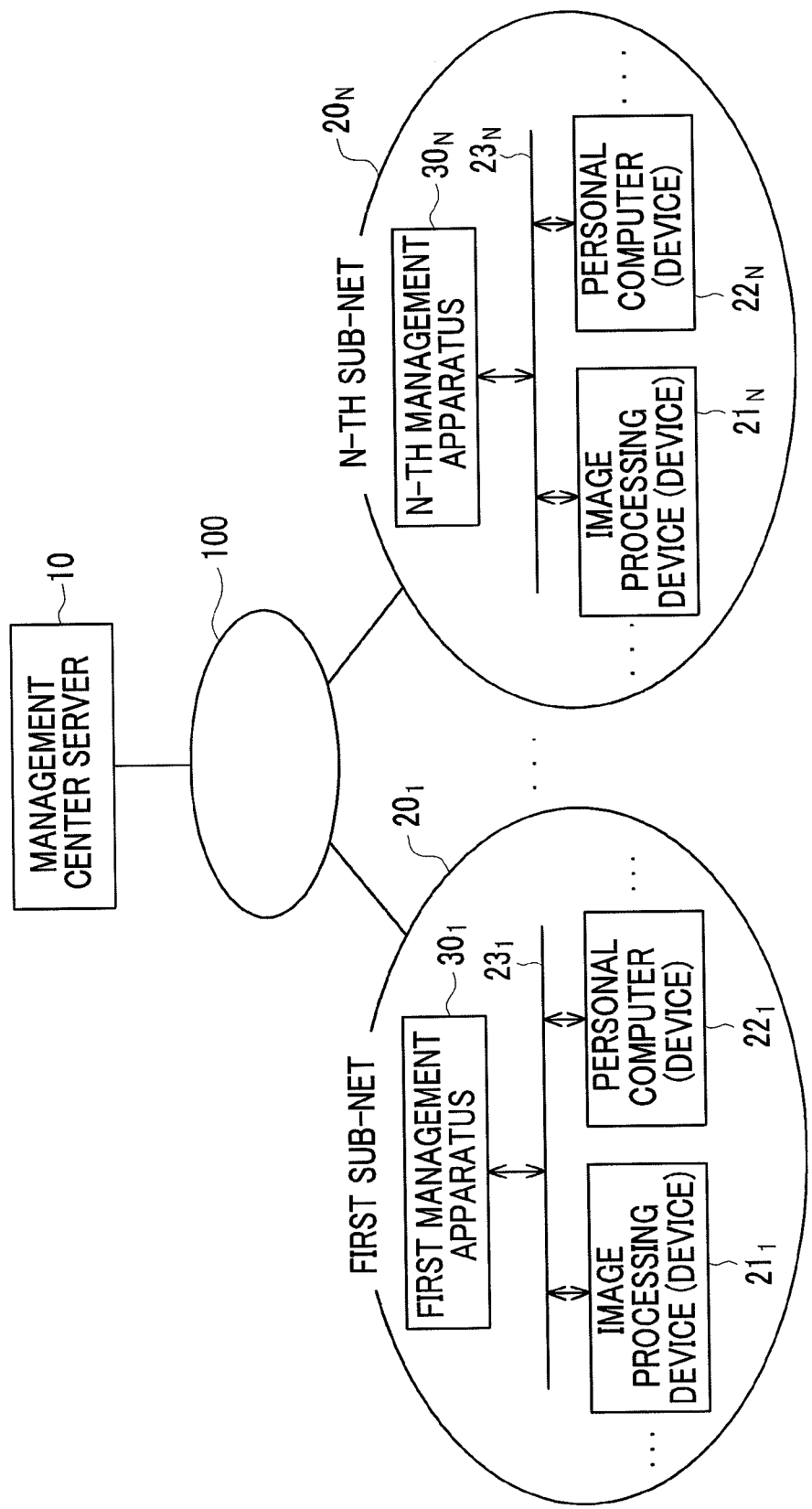
FIG. 1 is a block diagram illustrating an example of the structure of a management system according to an exemplary embodiment.

FIG. 1 shows an example of the structure of a management system 1.

As shown in FIG. 1, in the management system 1, a management center server 10 is connected to plural sub-nets $20_1$, $20_2$, ..., $20_{N-1}$, and $20_N$ (N is an arbitrary integer), which are management targets, through a communication unit 100, such as a LAN (Local Area Network) or an Internet communication line.

For example, management apparatuses $30_1$, $30_2$, ..., $30_{N-1}$, and $30_N$, image forming devices $21_1$, $21_2$, ..., $21_{N-1}$, and $21_N$, and personal computers $22_1$, $22_2$, ..., $22_{N-1}$, and $22_N$ are connected to the sub-nets $20_1$ to $20_N$, respectively.

The management apparatuses $30_1$ to $30_N$ manage various kinds of devices (processing devices), such as the image forming devices $21_1$ to $21_N$ and the personal computers $22_1$ to $22_N$ in the sub-nets $20_1$ to $20_N$, which are management targets, through the communication units $23_1$, $23_2$, ..., $23_{N-1}$, and $23_N$, such as LANs (Local Area Networks), according to a communication protocol, such as an SNMP (Simple Network Management Protocol), respectively.

The management apparatuses $30_1$ to $30_N$ register and store the IP address (Internet Protocol Addresses) of each device in a table, periodically collect the information of each device through the communication units $23_1$ to $23_N$, detect the state of each device, and notify the state of each device to the management center server 10, if necessary. In addition, the management apparatuses $30_1$ to $30_N$ manage the history information of each device. When a specific event is detected, the management apparatuses $30_1$ to $30_N$ determine whether to notify the detection of the specific event to the management center server 10 on the basis of the history. For example, each of the management apparatuses $30_1$ to $30_N$ may register a predetermined number of devices, for example, 100 devices and manage the devices.

For convenience of explanation, the communication units are divided into the communication unit 100 and the communication units $23_1$, $23_2$, ..., $23_{N-1}$, and $23_N$. However, the same communication unit may be used.

The image forming devices or the personal computers are given as examples of the devices managed by the management apparatuses $30_1$ to $30_N$, but the invention is not limited thereto. In addition, each of the management apparatuses $30_1$ to $30_N$ may manage different combinations of the devices. That is, any devices may be applied to this exemplary embodiment as long as they have a structure managed by the management apparatuses $30_1$ to $30_N$.

The management center server 10 manages each device in the sub-nets $20_1$ to $20_N$ through the management apparatuses $30_1$ to $30_N$.

For example, the management system 1 may be constructed such that the sub-nets $20_1$ to $20_N$ are customers and the management center server 10 is an administrator and the administrator may provide, for example, business, maintenance, and logistics services. In this case, for example, each of the sub-nets $20_1$ to $20_N$ is constructed in a customer intranet and the management apparatuses $30_1$ to $30_N$ manage the sub-nets $20_1$ to $20_N$ in the intranet.

In this example, for example, each of the management apparatuses $30_1$ to $30_N$ performs various kinds of management operations, such as a failure state management operation, a printout management operation, and a supply management operation, on each device in the sub-nets $20_1$ to $20_N$ and transmits the management information to the management center server 10. The management center server 10 searches for an operator (for example, a customer engineer) for repairing the failure of the device on the basis of the management information transmitted to the management center server 10.

In the management system 1 having the above-mentioned structure, the management apparatus 30 (arbitrary management apparatus) periodically acquires information from the device in the sub-net 20, which is a management target, detects the state of the device, periodically searches for the sub-net 20, which is a management target, and determines whether the IP address of the registered device is changed.

By the way, the operator determines whether to set the device as a management target and registers the device in the management center server 10. However, when the IP address of the registered device is changed by a customer and the device is moved to a sub-net (a sub-net managed by another management apparatus) other than the management target after the registration, the management apparatus 30 cannot collect information from the device since the device is not in the sub-net 20, which is a management target. In addition, the management apparatus 30 cannot detect the device even when it periodically searches for the sub-net 20, which is a management target. For example, the device may be moved between the sub-nets by a change in physical connection in addition to the change in the IP address.

In addition, since the setting of the device moved to the sub-net, other than a management target, is changed only by the operator, labor costs are generated or it takes time to recover a failure. Therefore, it is difficult to provide a management service for the device (for example, the dispatch of the operator due to a failure) during the recovery.

A technique is also considered in which, when the management apparatus searches for the sub-net, which is a management target, and detects the device whose IP address is changed, the IP address setting registration information of the device is changed. As described above, when the device is moved to a sub-net other than the management target, the management apparatus cannot detect the device from the sub-net managed by the management apparatus even though this technique is applied.

For example, even when the technique disclosed in JP-A-2007-206998, in which notification of error information is provided when the same segment is searched and it is difficult to detect a device, is applied, it is difficult to perform other recovery processes.

In contrast, in this exemplary embodiment, the following structure and process make it possible to continuously manage the device moved between the sub-nets.

Figure 2:
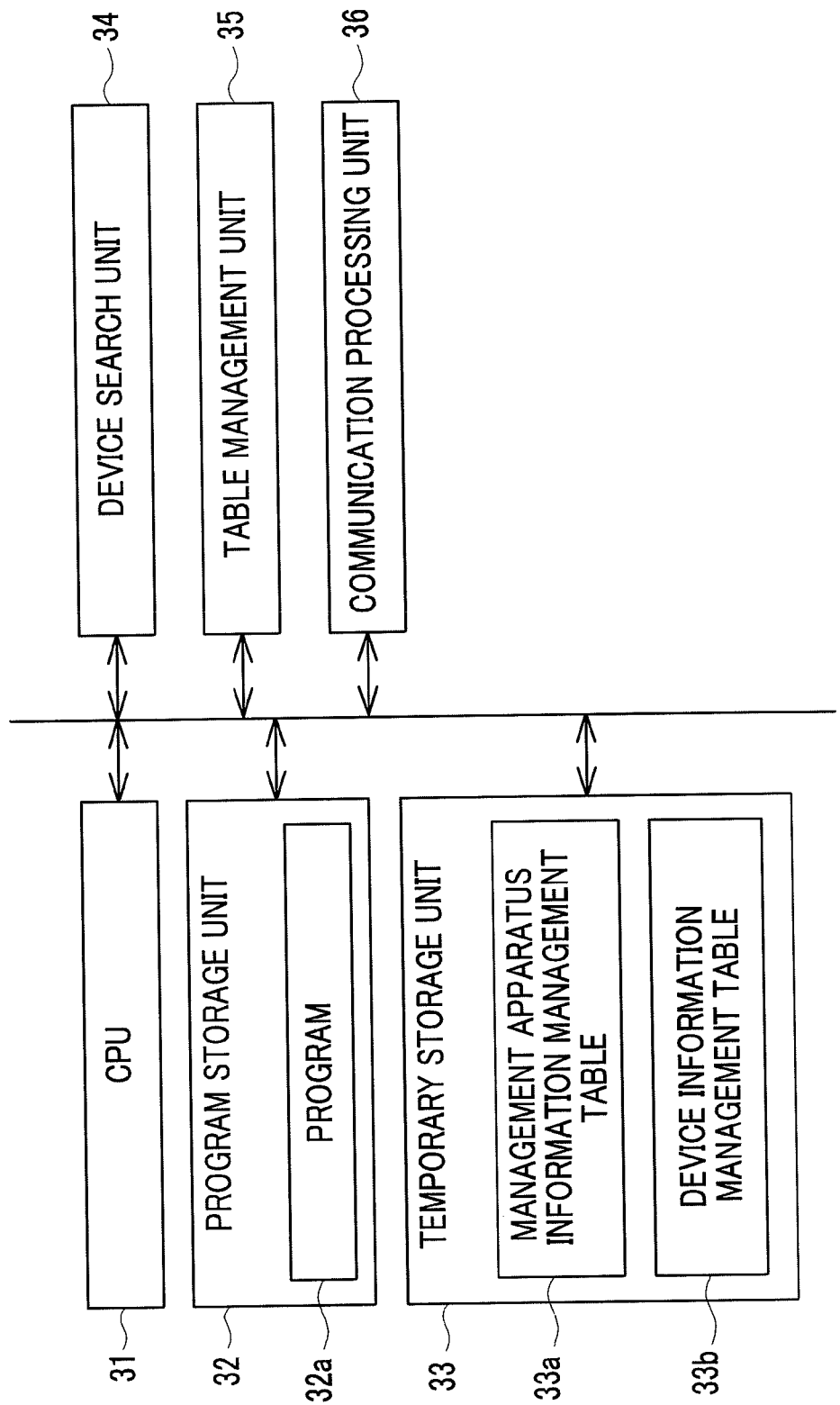
FIG. 2 is a block diagram illustrating an example of the structure of a management apparatus.

FIG. 2 shows an example of the structure of each of the management apparatuses $30_1$ to $30_N$.

As shown in FIG. 2, each of the management apparatuses $30_1$ to $30_N$ includes a CPU (Central Processing Unit) 31, a storage unit 32 that stores, for example, programs (hereinafter, referred to as a program storage unit 32), a temporary storage unit 33, a device search unit 34, a table management unit 35, and a communication processing unit (notification and request issuing unit) 36.

The program storage unit 32 is a storage unit capable of storing data even when the power is turned off. The program storage unit 32 stores, for example, a program 32a or fixed data used by the CPU to perform various kinds of processes. An exemplary example of the program storage unit 32 is a ROM (Read-Only Memory). In addition, the program storage unit 32 may be a non-volatile storage unit, such as an EEPROM (Electrically Erasable Programmable Read-Only Memory), but the invention is not limited thereto.

The program 32a may be stored in the program storage unit 32 before the shipment of the management apparatus or it may be read from a recording medium, such as a CD-ROM, by the operation of the user and then stored in the program storage unit 32 after the shipment of the management apparatus.

The temporary storage unit 33 is a data writable storage unit that temporarily stores data. An exemplary example of the temporary storage unit 33 is a RAM (Random Access Memory), but the temporary storage unit 33 is not limited thereto.

The temporary storage unit 33 stores a management apparatus information management table 33a and a device information management table 33b. The management apparatus information management table 33a and the device information management table 33b may be stored in a non-volatile storage unit, such as an EEPROM, but the invention is not limited thereto.

Each of the management apparatuses $30_1$ to $30_N$ may store the management apparatus information management table 33a and the device information management table 33b in a single external storage device (for example, a server) or plural external storage devices (for example, servers) corresponding to the tables.

The CPU 31 reads, for example, the program 32a from the program storage unit 32 to the temporary storage unit 33 and performs various kinds of processes, if necessary.

The content of the processes of the device search unit 34, the table management unit 35, and the communication processing unit 36 will be described below. The device search unit 34, the table management unit 35, and the communication processing unit 36 may be implemented as the functions of the CPU by the operation of the CPU.

Figure 3:
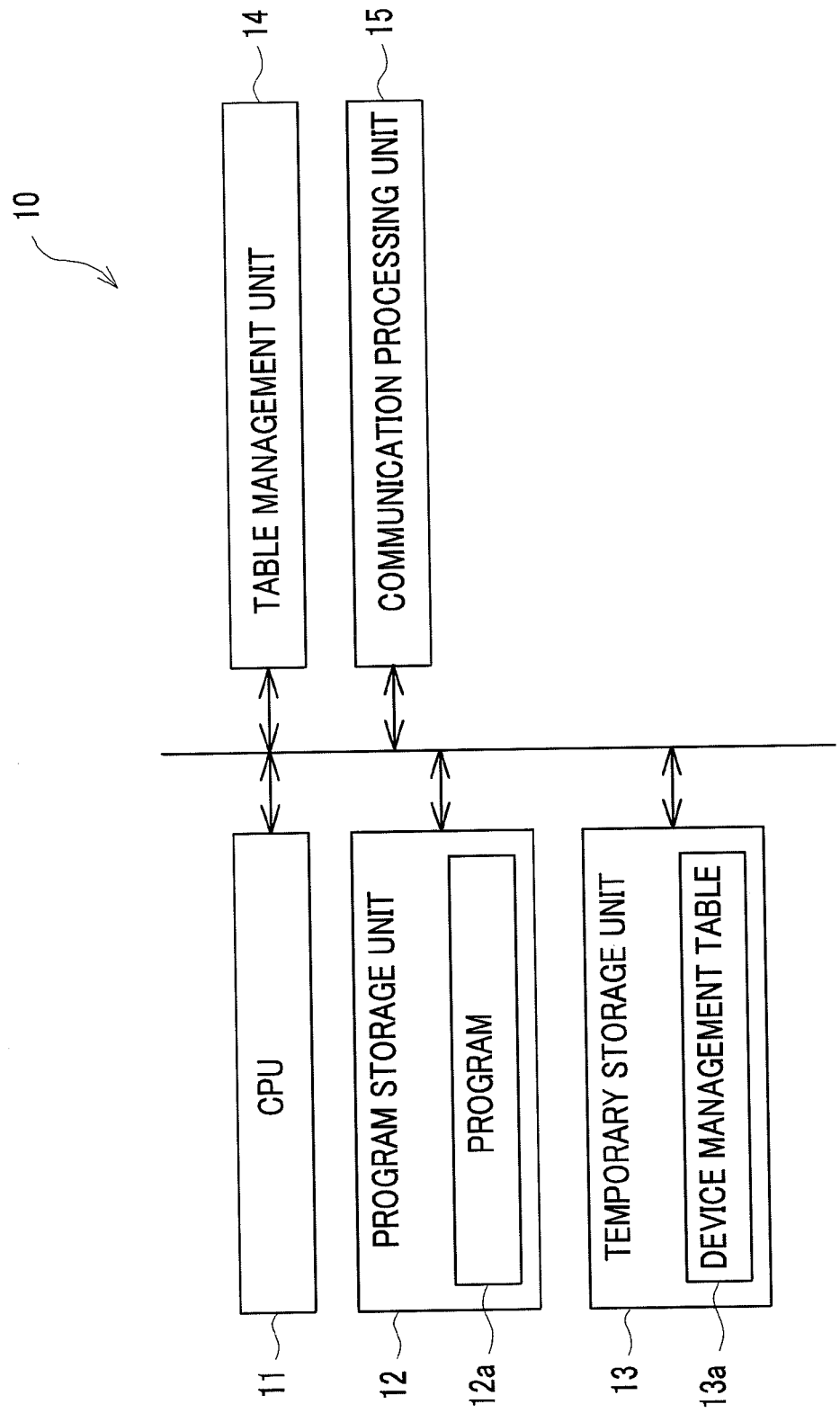
FIG. 3 is a block diagram illustrating an example of a management center server.

FIG. 3 shows an example of the structure of the management center server 10.

As shown in FIG. 3, the management center server 10 includes a CPU 11, a storage unit 12 that stores, for example, programs (hereinafter, referred to as a program storage unit 12), a temporary storage unit 13, a table management unit 14, and a communication processing unit (request issuing unit) 15.

The program storage unit 12 is a storage unit capable of storing data even when power is turned off. The program storage unit 12 stores, for example, a program 12a or fixed data used by the CPU 11 to perform various kinds of processes. An exemplary example of the program storage unit 12 is a ROM. In addition, the program storage unit 12 may be a non-volatile storage unit, such as an EEPROM, but the invention is not limited thereto.

The program 12a may be stored in the program storage unit 12 before the shipment of the management apparatus or it may be read from a recording medium, such as a CD-ROM, by the operation of the user and then stored in the program storage unit 12 after the shipment of the management apparatus.

The temporary storage unit 13 is a data writable storage unit that temporarily stores data. An exemplary example of the temporary storage unit 13 is a RAM, but the temporary storage unit 13 is not limited thereto.

The temporary storage unit 13 stores a device management table 13a. The device management table 13a may be stored in a non-volatile storage unit, such as an EEPROM, but the invention is not limited thereto.

The management center server 10 may store the device management table 13a in an external storage device (for example, a server).

The CPU 11 reads, for example, the program 12a from the program storage unit 12 to the temporary storage unit 13 and performs various kinds of processes, if necessary.

The content of the processes of the table management unit 14 and the communication processing unit 15 will be described below. The table management unit 14 and the communication processing unit 15 may be implemented as the functions of the CPU 11 by the operation of the CPU 11.

Next, the content of the process of each unit of an N-th management apparatus (arbitrary management apparatus) $30_N$ and the management center server 10 will be described with reference to FIGS. 4 to 6.

Figure 4:
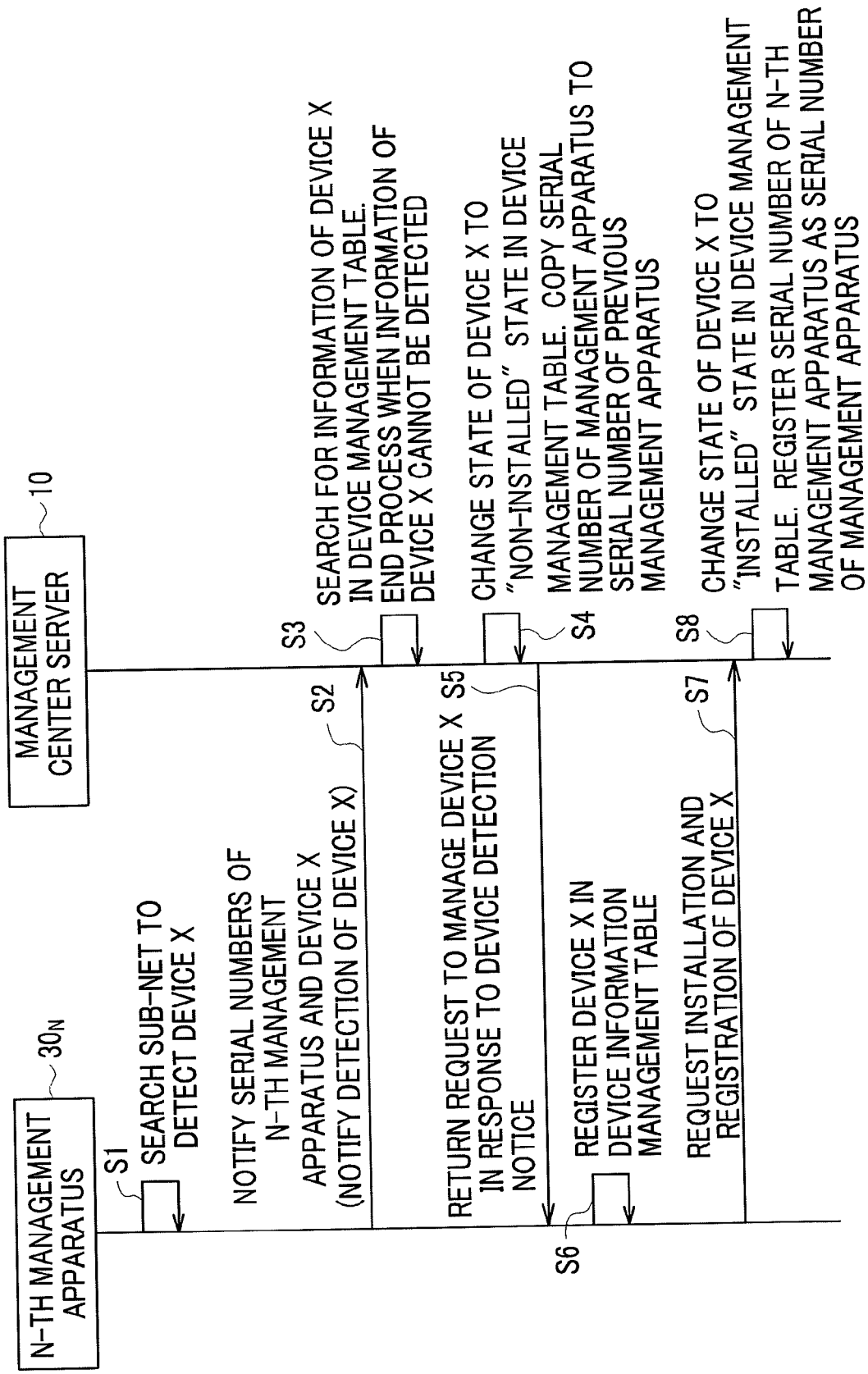
FIG. 4 is a diagram illustrating an example of a communication sequence performed between the management apparatus and the management center server when the management apparatus detects a new device.
Figure 5:
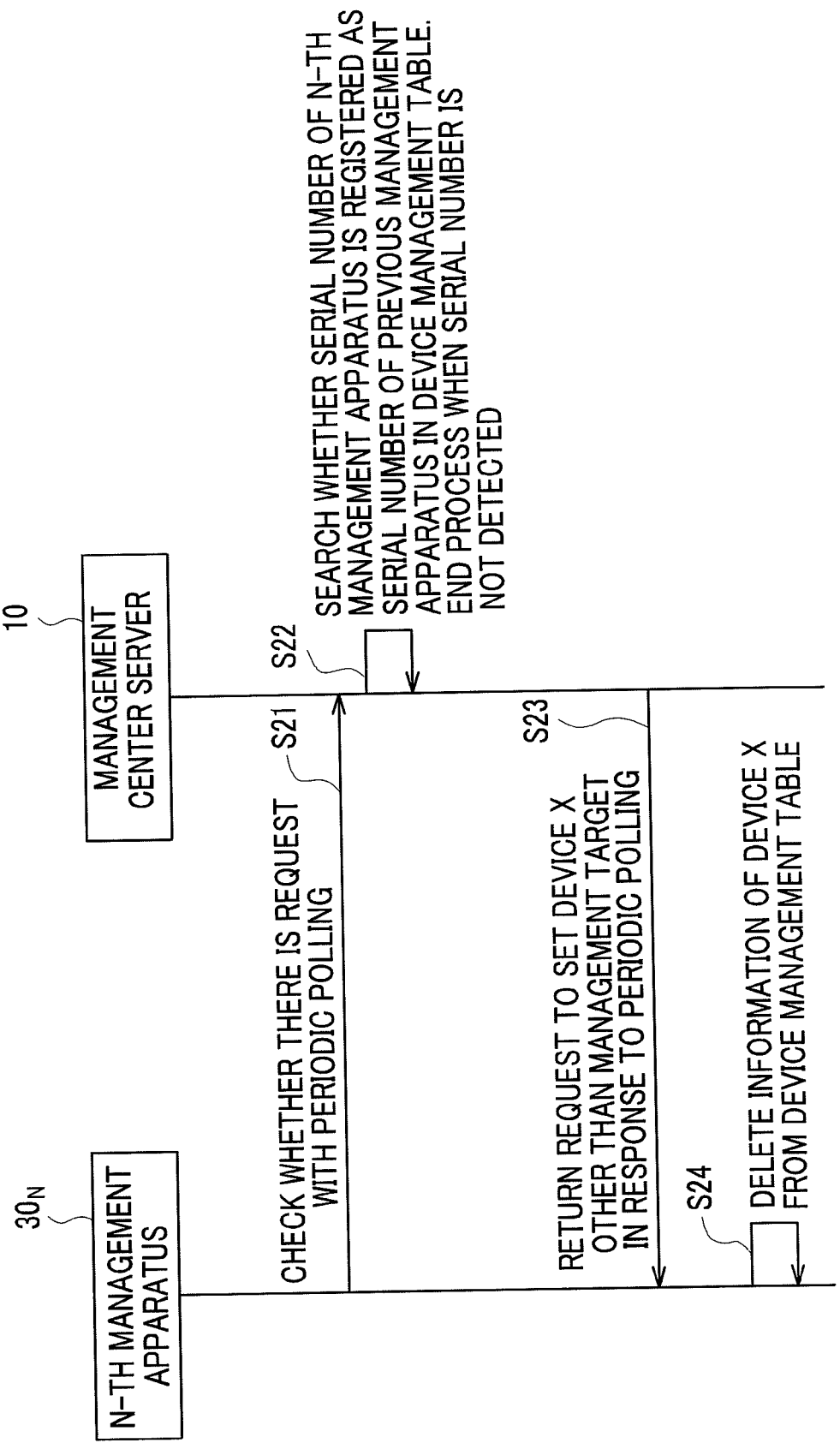
FIG. 5 is a diagram illustrating an example of a communication sequence performed between the management apparatus and the management center server when the management apparatus detects a new device.
Figure 6:
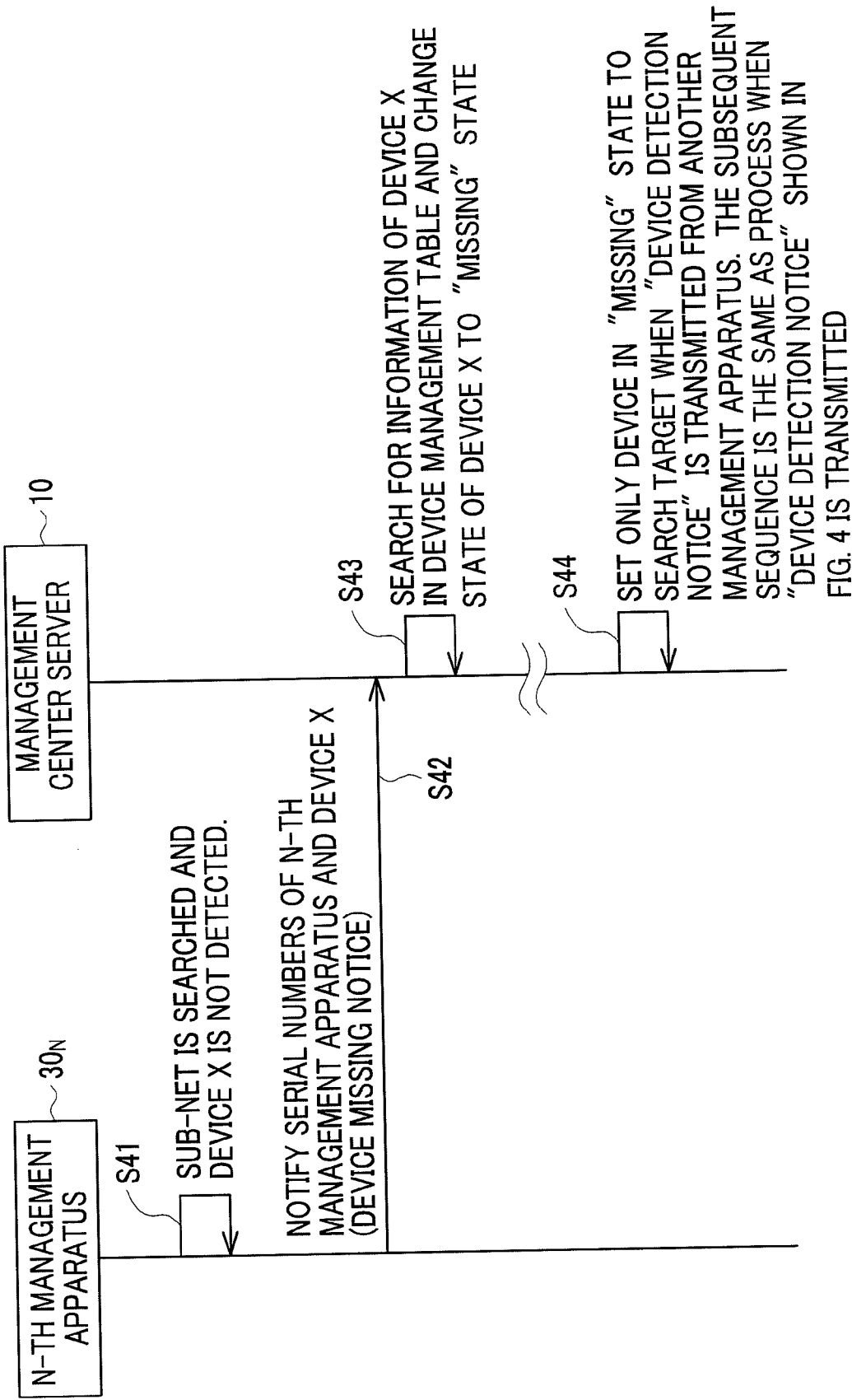
FIG. 6 is a diagram illustrating an example of a communication sequence performed between the management apparatus and the management center server when the management apparatus cannot detect a target device.

FIGS. 4 to 6 show a communication sequence between the N-th management apparatus $30_N$ and the management center server. FIG. 4 shows a communication sequence when the N-th management apparatus $30_N$ (for example, the second management apparatus) detects a new device. FIG. 5 shows a communication sequence when a device is moved from the N-th management apparatus $30_N$ (for example, the first management apparatus). FIG. 6 shows a communication sequence when the N-th management apparatus $30_N$ (for example, the first management apparatus) cannot detect a target device.

As shown in FIG. 4, in the communication sequence related to the detection of a new device, first, the N-th management apparatus $30_N$ periodically (for example, at an interval of about 5 minutes) searches for an N-th sub-net $20_N$, which is a management target, using the device search unit 34 (Step S1). As a result of the search of the sub-net by the device search unit 34, when the N-th management apparatus $30_N$ detects a new device X (for example, a new image forming device or a personal computer) with reference to the device information management table 33b, it transmits a device detection notice (information indicating the detection of a processing device) to the management center server 10 using the communication processing unit 36 (Step S2). The device detection notice includes the serial number of the N-th management apparatus $30_N$ and the serial number of the newly detected device.

Figure 7:
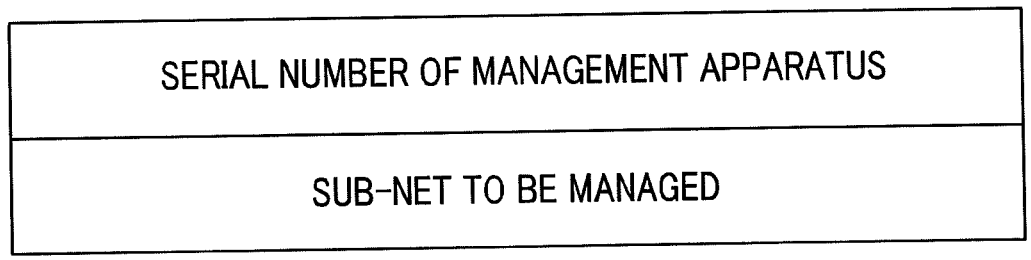
FIG. 7 is a diagram illustrating an example of a management apparatus information management table.
Figure 8:
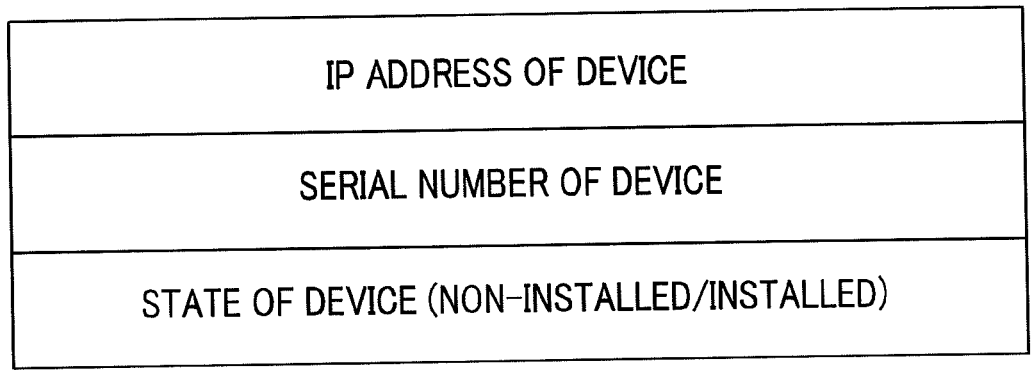
FIG. 8 is a diagram illustrating an example of a device information management table.

FIG. 7 shows an example of the management apparatus information management table 33a. FIG. 8 shows an example of the device information management table 33b.

As shown in FIG. 7, the management apparatus information management table 33a includes the serial number of the management apparatus and the information of the sub-net, which is a management target. The device information management table 33b includes the IP address, serial number, and state information of each device. For example, the device serial number is a device model code and a device model number, but is not limited thereto. Any information peculiar to the device may be used as the device serial number.

The device search unit 34 detects a new device on the basis of the device information management table 33b. That is, the device search unit 34 checks whether the serial number of each device in the N-th sub-net $20_N$ is included in the device information management table 33b and detects the device with a new device serial number as a new device.

The communication processing unit 36 adds the serial number of the N-th management apparatus $30_N$ and the serial number of the newly detected device to the device detection notice with reference to the management apparatus information management table 33a and the device information management table 33b.

When receiving the device detection notice from the N-th management apparatus $30_N$, the management center server 10 searches for the information of the device X (the new device detected by the N-th management apparatus $30_N$) related to the device detection notice in the device management table 13a using the table management unit 14 (Step S3). In this case, the table management unit 14 preferentially searches for a device in a "missing" state in the device management table 13a. A process of setting the state of the device to the "missing" state in the device management table 13a is implemented by the communication sequence shown in FIG. 6, which will be described below.

FIG. 9 shows an example of the device management table 13a.

As shown in FIG. 9, the device management table 13a includes the IP address, serial number, and state information of each device, the serial number of the previous management apparatus, and the serial number of the (current or latest) management apparatus.

When detecting the information of the device X from the device management table 13a, the table management unit 14 remotely withdraws the device X (Step S4). That is, the table management unit 14 changes the state of the device X to a "non-installed" state in the device management table 13a. In addition, the table management unit 14 copies the serial number of the management apparatus to the serial number of the previous management apparatus in the device management table 13a (Step S4).

The management center server 10 ends the process when it receives the device detection notice, but cannot detect the information of the device related to the device detection notice from the device management table 13a, that is, when the device related to the device detection notice is not managed by any management apparatus. The reason why this process is performed is that, when the device related to the device detection notice is not managed by any management apparatus, the operator needs to determine the setting of the device.

Then, in the management center server 10, the communication processing unit 36 responds to the device detection notice. That is, the communication processing unit 36 returns a request to manage the device X to the N-th management apparatus $30_N$ in response to the device detection notice indicating the detection of the information of the device X from the device management table 13a (Step S5).

When receiving the request to manage the device X from the management center server 10, the N-th management apparatus $30_N$ registers the device X in the device information management table 33b using the table management unit 35 (Step S6). Specifically, the table management unit 35 registers the IP address, serial number, and state information of the device X in the device information management table 33b.

Then, the N-th management apparatus $30_N$ transmits a request to install and register the device X to the management center server 10 using the communication processing unit 36 (Step S7).

When receiving the request to install and register the device X from the N-th management apparatus $30_N$, the management center server 10 changes the state of the device X to an "installed" state in the device management table 13a using the table management unit 14 (Step S8). In addition, the table management unit 14 registers the serial number of the N-th management apparatus $30_N$ as the serial number of the management apparatus in the device management table 13a (Step S8).

As shown in FIG. 5, in the communication sequence related to, for example, the movement of the device, first, the N-th management apparatus $30_N$ periodically (for example, one polling operation a day) performs polling using the communication processing unit 36 to check whether a request is transmitted to the management center server 10 (Step S21).

In the management center server 10, the table management unit 14 searches whether the serial number of the N-th management apparatus $30_N$ is registered as the serial number of the previous management apparatus in the device management table 13a in response to the request from the N-th management apparatus $30_N$ (Step S22). The table management unit 14 ends the process when the serial number of the N-th management apparatus $30_N$ is not registered as the serial number of the previous management apparatus in the device management table 13a. In addition, in the management center server 10, when the table management unit 14 detects that the serial number of the N-th management apparatus $30_N$ is registered as the serial number of the previous management apparatus in the device management table 13a, the communication processing unit 15 returns a request (changed information) to exclude the device X related to the serial number of the previous management apparatus from the management target to the N-th management apparatus $30_N$ in response to the periodic polling (Step S23).

When receiving the request to exclude the device X from the management target from the management center server 10, the N-th management apparatus $30_N$ deletes the information of the device X from the device information management table 33b using the table management unit 35 (Step S24).

As shown in FIG. 6, in the communication sequence related to the detection of a target device, first, the N-th management apparatus $30_N$ periodically (for example, at an interval of about 5 minutes) searches for the N-th sub-net $20_N$, which is a management target, using the device search unit 34 (Step S41). When the device search unit 34 cannot detect the device X as a result of the search of the sub-net, the N-th management apparatus $30_N$ transmits a device missing notice (communication unavailable information) to the management center server 10 using the communication processing unit 36 (Steps S41 and S42). In this case, the device missing notice includes the serial number of the N-th management apparatus $30_N$ and the serial number of the device X. That is, the communication processing unit 36 adds the serial number of the N-th management apparatus $30_N$ and the serial number of the detected device to the device missing notice with reference to the management apparatus information management table 33a and the device information management table 33b.

When the management center server 10 receives the device missing notice from the N-th management apparatus $30_N$, the table management unit 14 searches for the information of the device X from the device management table 13a (Step S43). Then, the table management unit 14 changes the state of the device X to a "missing" state in the device management table 13a.

Then, when the management center server 10 receives the device detection notice related to the device X transmitted from another management apparatus, the table management unit 14 searches for the device in a "missing" state prior to the devices in the other states in the device management table 13a. Then, the management center server 10 performs the same process as that shown in FIG. 4 when the information of the device X is detected from the device management table 13a by the search of the table management unit 14. That is, for example, when the information of the device X is detected from the device management table 13a, the management center server 10 changes the state of the device X to a "non-installed" state in the device management table 13a using the table management unit 14 (for example, Step S4).

Next, the structure and process of the management apparatuses $30_1$ to $30_N$ and the management center server 10 will be described with reference to examples shown in FIGS. 10 to 12.

Figure 10:
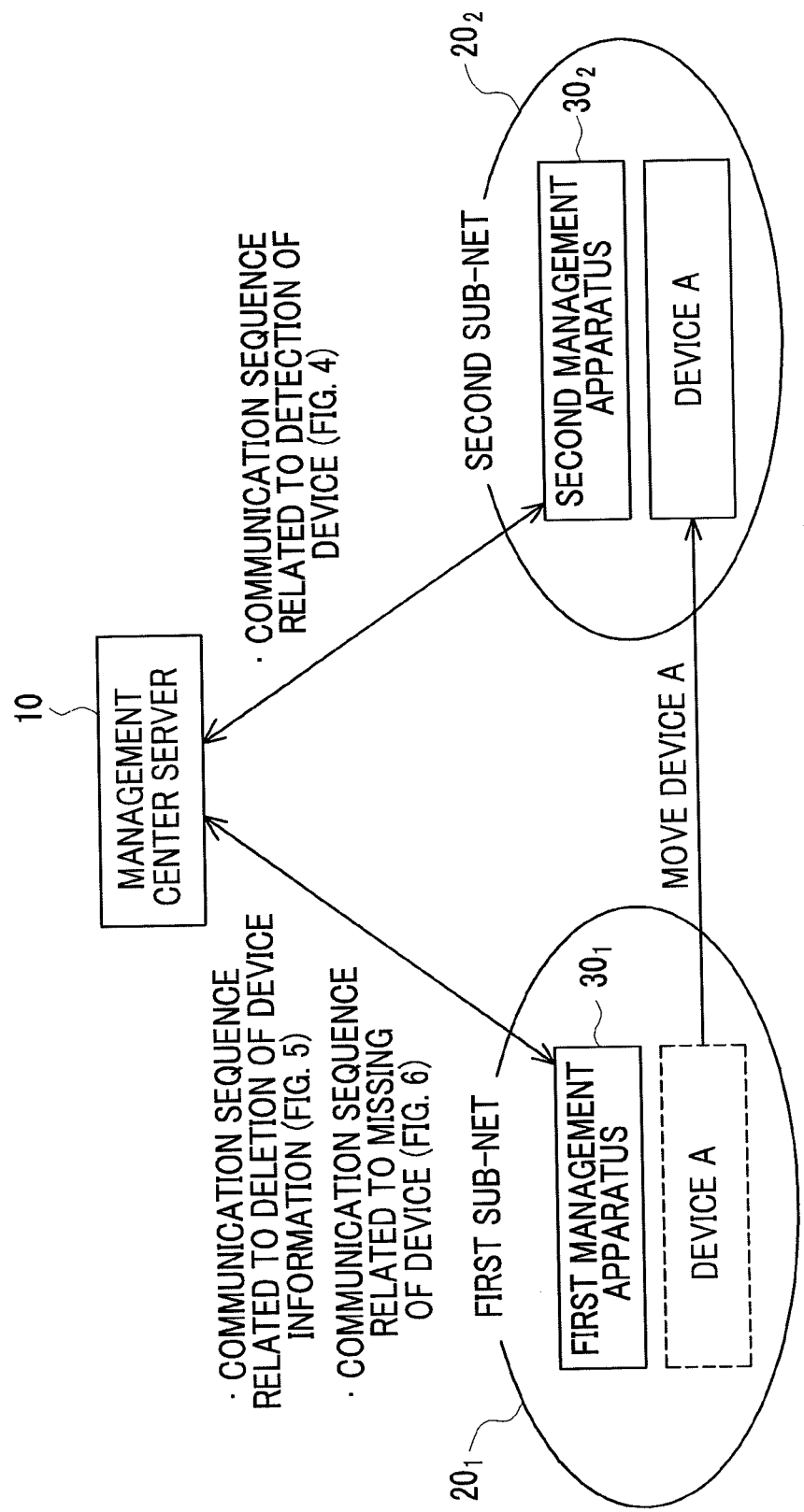
FIG. 10 is a diagram illustrating an example in which a device A connected to a first sub-net which is managed by a first management apparatus is moved to a second sub-net managed by a second management apparatus.

(1) FIG. 10 shows an example in which a device A in the first sub-net $20_1$ managed by the first management apparatus $30_1$ (arbitrary management apparatus) is moved to the second sub-net $20_2$ managed by the second management apparatus $30_2$ (another arbitrary management apparatus).

In this case, the communication sequence related to the detection of a device shown in FIG. 4 is performed between the second management apparatus $30_2$ and the management center server 10.

That is, in the second management apparatus $30_2$, the device A is registered in the device information management table 33b. In the device management table 13a of the management center server 10, the state of the device A is changed to a "non-installed" state and the serial number of the first management apparatus $30_1$ is registered as the serial number of the previous management apparatus (the serial number of the (current or latest) management apparatus is copied to the serial number of the previous management apparatus). In the management center server 10, at the time when the second management apparatus $30_2$ registers the device A in the device information management table 33b, the state of the device A is changed to an "installed" state in the device management table 13a, that is, a change in the management state of the device is completed, and the serial number of the second management apparatus $30_2$ is registered as the serial number of the management apparatus in the device management table 13a.

As such, when a new device A is detected in the sub-net $20_1$ managed by the second management apparatus $30_2$, the second management apparatus $30_2$ registers the newly detected device A as a management target in the management center server 10 (update of registration) and manages the newly detected device A thereafter.

That is, when the newly detected device A, which is not a management target, has already been registered in the management center server 10, the second management apparatus $30_2$ registers the device A as a management target in the device information management table 33b.

In this way, the management system 1, the management center server 10, or the second management apparatus $30_2$ is capable of continuously managing the device moved between the sub-nets.

The communication sequence related to the deletion of device information shown in FIG. 5 and the communication sequence related to the missing of a device shown in FIG. 6 are performed between the first management apparatus $30_1$ and the management center server 10.

That is, when the management center server 10 detects the serial number of the first management apparatus $30_1$ from the serial number of the management apparatus that has previously managed the device A in the device management table 13a at the periodic polling time of the first management apparatus $30_1$, the first management apparatus $30_1$ deletes the information of the device A from the device information management table 33b in response to a request from the management center server 10.

Since the first management apparatus $30_1$ cannot detect the device A in the first sub-net $20_1$, which is a management target, the management center server 10 changes the state of the device A to a "missing" state in the device management table 13a.

Next, the relation between the communication sequences shown in FIGS. 4 to 6 will be described. When the communication sequence shown in FIG. 4 is not performed up to the last process, the communication sequence shown in FIG. 5 is also not performed up to the last process. That is, the communication sequence shown in FIG. 5 depends on the communication sequence shown in FIG. 4. However, the communication sequence shown in FIG. 6 does not depend on the communication sequences shown in FIGS. 4 and 5. That is, the communication sequence shown in FIG. 4 may be performed after the communication sequence shown in FIG. 6, depending on the execution timing of the first management apparatus $30_1$.

In some cases, after the communication sequence shown in FIG. 6 is performed and the management center server 10 changes the state of the device A to a "missing" state in the device management table 13a, the communication sequence shown in FIG. 4 is performed and the second management apparatus $30_2$ transmits the device detection notice related to the device A to the management center server 10. Then, in the management center server 10, the table management unit 14 searches for the device in a "missing" state in the device management table 13a in advance. Then, as a result of the search, when the information of the device A is detected from the device management table 13a, the table management unit 14 changes the state of the device A to a "non-installed" state and registers the serial number of the first management apparatus $30_1$ as the serial number of the previous management apparatus.

Figure 11:
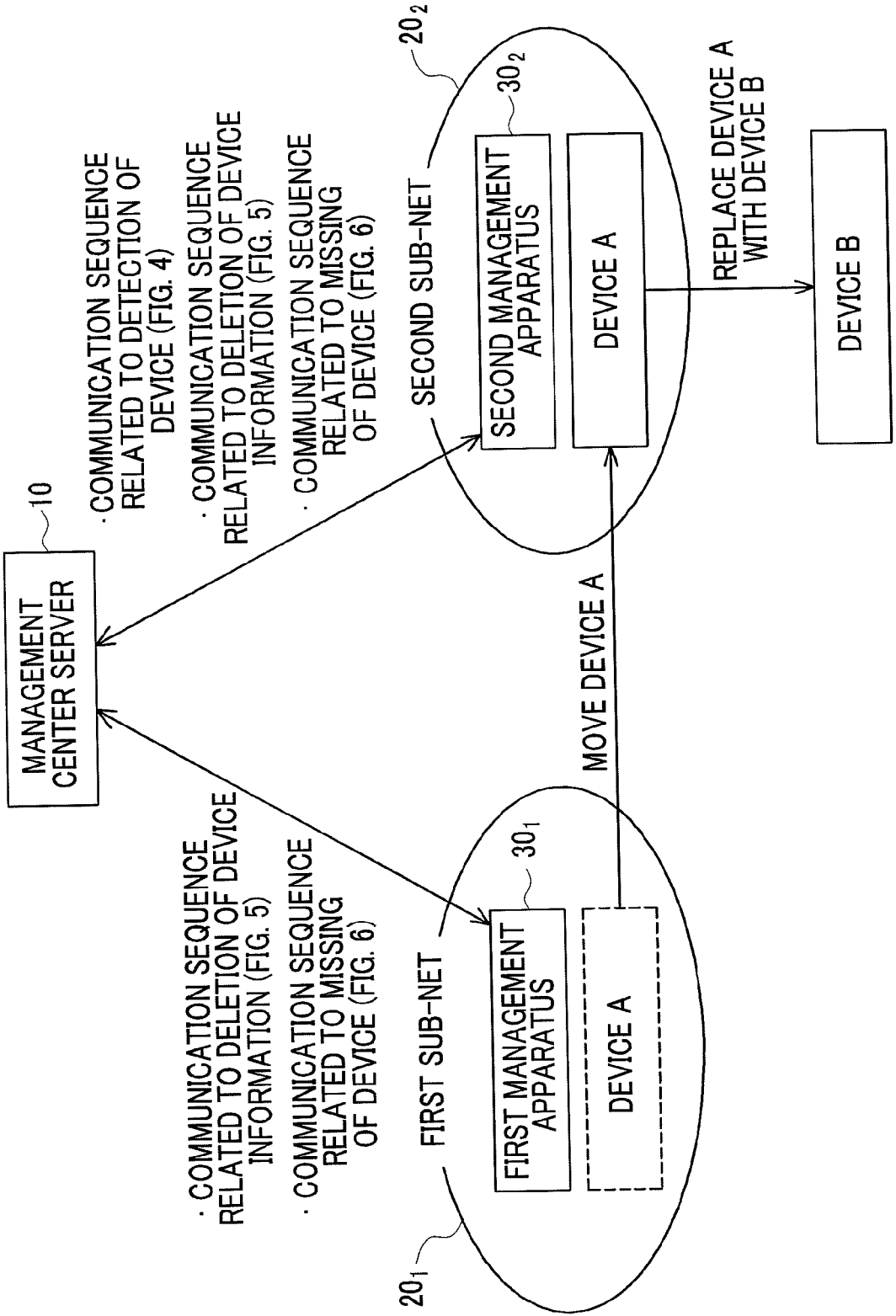
FIG. 11 is a diagram illustrating an example in which the device B connected to the second sub-net which is managed by the second management apparatus is replaced with the device A connected to the first sub-net managed by the first management apparatus.

(2) FIG. 11 shows an example in which a device B in the second sub-net $20_2$ managed by the second management apparatus $30_2$ is replaced with the device A in the first sub-net $20_1$ managed by the first management apparatus $30_1$. For example, the device A is moved to the second sub-net $20_2$, the IP address of the device B is set to the device A, and the IP address of the device B is changed to a value that cannot be searched by the second management apparatus $30_2$.

In this case, the communication sequence related to the detection of a device shown in FIG. 4, the communication sequence related to the deletion of device information shown in FIG. 5, and the communication sequence related to the missing of a device shown in FIG. 6 are performed between the second management apparatus $30_2$ and the management center server 10.

That is, the second management apparatus $30_2$ registers the device A in the device information management table 33b. In the communication sequence related to the detection of a device shown in FIG. 4, the second management apparatus $30_2$ detects the device A as a new device since the IP address of the device A is registered in the device information management table 33b, but the serial number of the device A is not identical to the serial number corresponding to the IP address.

In the device management table 13a of the management center server 10, the state of the device A is changed to a "non-installed" state and the serial number of the first management apparatus $30_1$ is registered as the serial number of the previous management apparatus. In the management center server 10, at the time when the second management apparatus $30_2$ registers the device A in the device information management table 33b, the state of the device A is changed to an "installed" state in the device management table 13a and the serial number of the second management apparatus $30_2$ is registered as the serial number of the management apparatus in the device management table 13a.

Since the second management apparatus $30_2$ cannot detect the device B in the second sub-net $20_2$, which is a management target, the management center server 10 changes the state of the device B to a "missing" state in the device management table 13a.

Since the management center server 10 cannot detect the serial number of the second management apparatus $30_2$ from the serial number of the management apparatus that has previously managed the device B in the device management table 13a even though periodic polling is performed, the second management apparatus $30_2$ ends the process without deleting the information of the device B from the device information management table 33b (while maintaining the information of the device B in the device information management table 33b).

Similar to FIG. 10, the communication sequence related to the deletion of device information shown in FIG. 5 and the communication sequence related to the missing of a device shown in FIG. 6 are performed between the first management apparatus $30_1$ and the management center server 10.

Figure 12:
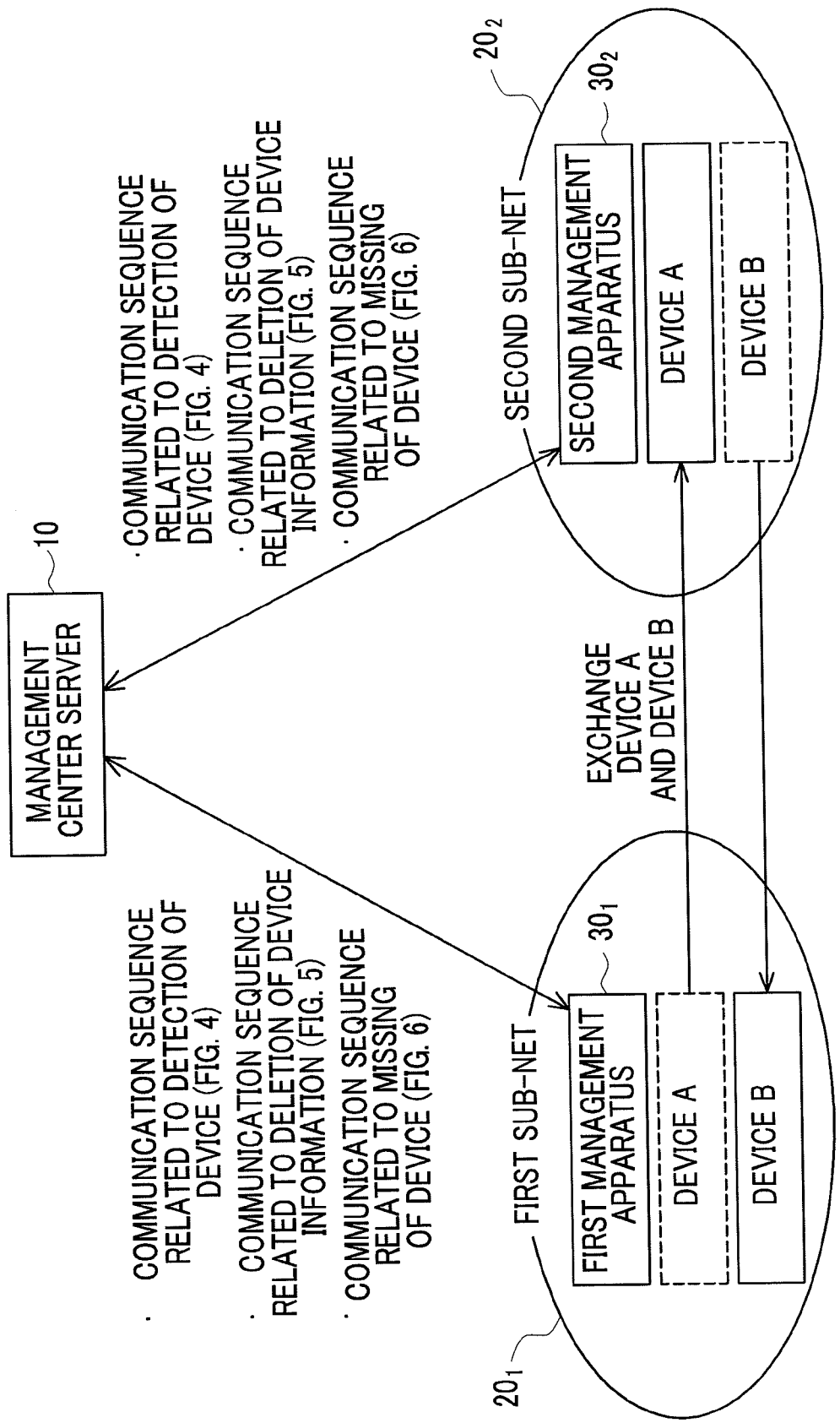
FIG. 12 is a diagram illustrating an example in which the device A in the first sub-net managed by the first management apparatus is exchanged with the device B in the second sub-net managed by the second management apparatus.

(3) FIG. 12 shows an example in which the device A in the first sub-net $20_1$ managed by the first management apparatus $30_1$ is exchanged with the device B in the second sub-net $20_2$ managed by the second management apparatus $30_2$. In this example, the IP address of the device A is reset to the IP address of the device B and the IP address of the device B is reset to the original IP address of the device A.

In this case, the communication sequence related to the detection of a device shown in FIG. 4, the communication sequence related to the deletion of device information shown in FIG. 5, and the communication sequence related to the missing of a device shown in FIG. 6 are performed between the first management apparatus $30_1$ and the management center server 10 and between the second management apparatus $30_2$ and the management center server 10.

That is, in the first management apparatus $30_1$, the device B is registered in the device information management table 33b. In the device management table 13a of the management center server 10, the state of the device B is changed to a "non-installed" state and the serial number of the second management apparatus $30_2$ is registered as the serial number of the management apparatus in the previous management process. In the management center server 10, at the time when the first management apparatus $30_1$ registers the device B in the device information management table 33b, the state of the device B is changed to an "installed" state in the device management table 13a and the serial number of the first management apparatus $30_1$ is registered as the serial number of the management apparatus in the device management table 13a.

When the management center server 10 detects the serial number of the first management apparatus $30_1$ from the serial number of the management apparatus that has previously managed the device A in the device management table 13a at the periodic polling time of the first management apparatus $30_1$, the first management apparatus $30_1$ deletes the information of the device A from the device information management table 33b in response to a request from the management center server 10.

Since the first management apparatus $30_1$ cannot detect the device A from the first sub-net $20_1$, which is a management target, the management center server 10 changes the state of the device A to a "missing" state in the device management table 13a.

In the second management apparatus $30_2$, the device A is registered in the device information management table 33b. In the device management table 13a of the management center server 10, the state of the device A is changed to a "non-installed" state and the serial number of the first management apparatus $30_1$ is registered as the serial number of the previous management apparatus. In the management center server 10, at the time when the second management apparatus $30_2$ registers the device A in the device information management table 33b, the state of the device A is changed to an "installed" state in the device management table 13a and the serial number of the second management apparatus $30_2$ is registered as the serial number of the management apparatus in the device management table 13a.

When the management center server 10 detects the serial number of the second management apparatus $30_2$ from the serial number of the management apparatus that has previously managed the device B in the device management table 13a at the periodic polling time of the second management apparatus $30_2$, the second management apparatus $30_2$ deletes the information of the device B from the device information management table 33b in response to a request from the management center server 10.

Since the second management apparatus $30_2$ cannot detect the device B from the second sub-net $20_2$, which is a management target, the management center server 10 changes the state of the device B to a "missing" state in the device management table 13a.

In this exemplary embodiment, the communication units $23_1$ to $23_N$ and the communication unit 100 correspond to, for example, a communication unit. The communication processing unit 36 corresponds to, for example, a first transmitting unit. The table management unit 35 corresponds to, for example, a first registration unit. The device information management table 33b corresponds to, for example, a first management table. The device management table 13a corresponds to, for example, a second management table. The table management unit 14 corresponds to, for example, a change unit. The communication processing unit 15 corresponds to, for example, a second transmitting unit. The management center server 10 corresponds to, for example, an information management server.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management system comprising:
    a plurality of management apparatuses each of which includes a first transmitting unit that, when processing devices connected to a communication unit are searched with reference to a first management table in which information of a processing device managed by the management apparatus is registered and a processing device which is not managed by the management apparatus is detected, transmits detection information of the processing device to the communication unit, and a first registration unit that, when a processing device management request corresponding to the detection information of the processing device is received from the communication unit, registers information of the processing device related to the processing device management request in the first management table; and
    an information management server that includes a change unit and a second transmitting unit,
    wherein, in the information management server, when information of the processing device related to the detection information of the processing device received from the communication unit is registered in a second management table in which the information of the processing device and information of the management apparatus managing the processing device are associated with each other, the change unit changes the information of the management apparatus associated with the information of the processing device which is related to the detection information of the processing device in the second management table to the information of the management apparatus transmitting the detection information of the processing device, and
    when the information of the processing device related to the detection information of the processing device received front the communication unit is registered in the second management table, the second transmitting unit transmits the processing device management request to the communication unit.

2. The management system according to claim 1,
    wherein, in the information management server, when the information of the management apparatus associated with the processing device is changed in the second management table, the second transmitting unit transmits changed information to the management apparatus related to the information of the management apparatus before the change, and
    the management apparatus further includes a deleting unit that deletes the information of the processing device related to the changed information from the first management table when the changed information is received from the communication unit.

3. The management system according to claim 2, wherein, when communication with the processing device registered in the first management table is unavailable, the first transmitting unit transmits communication unavailable information of the processing device to the communication unit,
the information management server further includes a second registration unit that registers the communication unavailable information in the second management table so as to be associated with the information of the processing device when the communication unavailable information of the processing device is received from the communication unit, and
the change unit searches for the information of the processing device associated with the communication unavailable information prior to the information of other processing devices which are not associated with the communication unavailable information in the second management table, and detects the information of the processing device related to the detection information of the processing device from the information of the processing devices registered in the second management table.

4. The management system according to claim 3, wherein the change unit completes a change in the information of the management apparatus after the first registration unit registers the information of the processing device in the first management table.

5. The management system according to claim 2, wherein the change unit completes a change in the information of the management apparatus after the first registration unit registers the information of the processing device in the first management table.

6. The management system according to claim 1, wherein, when communication with the processing device registered in the first management table is unavailable, the first transmitting unit transmits communication unavailable information of the processing device to the communication unit,
the information management server further includes a second registration unit that registers the communication unavailable information in the second management table so as to be associated with the information of the processing device when the communication unavailable information of the processing device is received from the communication unit, and
the change unit searches for the information of the processing device associated with the communication unavailable information prior to the information of other processing devices which are not associated with the communication unavailable information in the second management table, and detects the information of the processing device related to the detection information of the processing device from the information of the processing devices registered in the second management table.

7. The management system according to claim 6, wherein the change unit completes a change in the information of the management apparatus after the first registration unit registers the information of the processing device in the first management table.

8. The management system according to claim 1, wherein the change unit completes a change in the information of the management apparatus after the first registration unit registers the information of the processing device in the first management table.

9. A management apparatus comprising:
a transmitting unit that, when processing devices connected to a communication unit are searched with reference to a management table in which information of a processing device managed by the management apparatus is registered and a processing device which is not managed by the management apparatus is detected, transmits detection information of the processing device to an information management server through the communication unit; and
a registration unit that, when a processing device management request corresponding to the detection information of the processing device is received from the communication unit, registers information of the processing device related to the processing device management request in the first management table;
wherein the processing device management request is sent from the information management server in a case where information about the detected processing device has been registered in a second management table which is stored in the information management server.

10. A management method comprising:
transmitting detection information of a processing device which is not managed by a management apparatus to an information management server through a communication unit when processing devices connected to the communication unit are searched with reference to a management table in which information of a processing device managed by the management apparatus is registered and the processing device which is not managed by the management apparatus is detected;
registering information of the processing device related to a processing device management request in the first management table when the processing device management request corresponding to the detection information of the processing device is received from the communication unit; and
sending the processing device management request from the information management server in a case where information about the detected processing device has been registered in a second management table which is stored in the information management server.

11. A non-transitory computer readable medium storing a control program that causes a computer to perform:
transmitting detection information of a processing device which is not managed by a management apparatus to an information management server through a communication unit when processing devices connected to the communication unit are searched with reference to a management table in which information of a processing device managed by the management apparatus is registered and the processing device which is not managed by the management apparatus is detected;
registering information of the processing device related to a processing device management request in the first management table when the processing device management request corresponding to the detection information of the processing device is received from the communication unit; and
sending the processing device management request from the information management server in a case where information about the detected processing device has been registered in a second management table which is stored in the information management server.

* * * * *